R. S. PIERCE AND M. R. KUEHN.
STEERING MECHANISM FOR VEHICLES.
APPLICATION FILED MAR. 17, 1920.
1,375,859.
Patented Apr. 26, 1921.
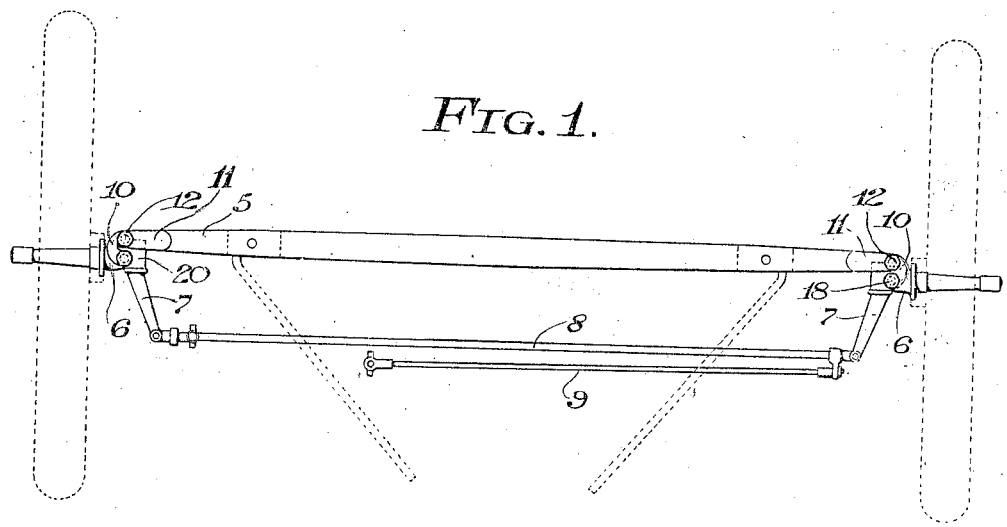
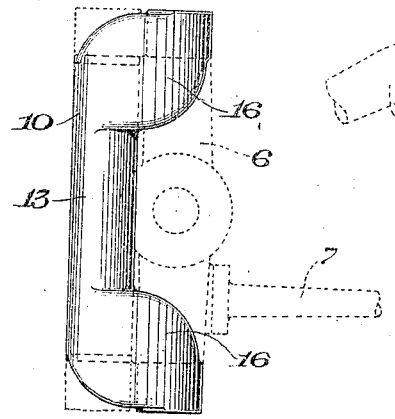
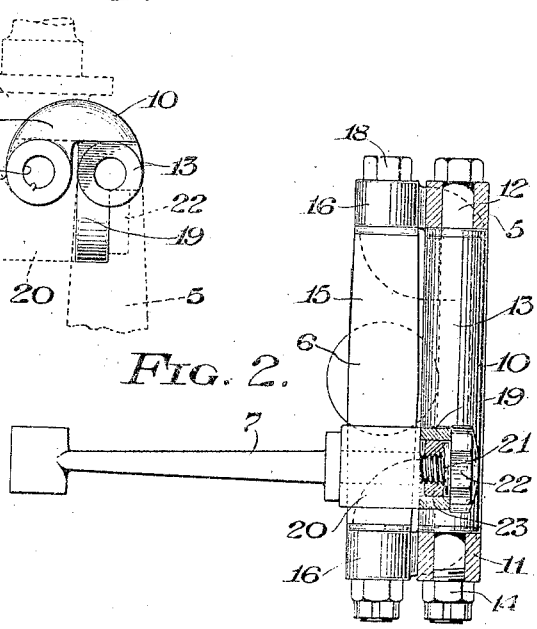
WITNESSES
INVENTORS.
Robert S. Pierce &
Max R. Kuehn,
By R. S. Caldwell
ATTORNEY.

UNITED STATES PATENT OFFICE.

ROBERT S. PIERCE AND MAX R. KUEHN, OF MILWAUKEE, WISCONSIN.

STEERING MECHANISM FOR VEHICLES.

1,375,859.   Specification of Letters Patent.   Patented Apr. 26, 1921.

Application filed March 17, 1920. Serial No. 366,495.

*To all whom it may concern:*

Be it known that we, ROBERT S. PIERCE, a citizen of the United States, and MAX R. KUEHN, a subject of Germany, residents of Milwaukee, in the county of Milwaukee and State of Wisconsin, have invented new and useful Improvements in Steering Mechanism for Vehicles, of which the following is a description, reference being had to the accompanying drawings, which are a part of this specification.

The invention relates to steering mechanism for motor driven vehicles.

It is a well known fact that an eccentric disposition of the wheel spindle with respect to its pivot connection with the axle will give a caster effect to the wheel which makes the steering of the vehicle easier and also produces a natural tendency for the wheels to keep the road. To obtain these advantages we have provided an attachment for use in connection with the usual wheel spindle to offset the spindle from the axle, the invention being more particularly herein shown and described in combination with the steering mechanism of a Ford automobile.

The invention is designed to provide an attachment for producing a set back spindle which can be installed without removing the wheel from the usual spindle and without removing the steering arm from this spindle which in the Ford automobile construction is a very difficult task.

The invention further consists in the several features hereinafter set forth and more particularly defined by claims at the conclusion hereof.

In the drawings, Figure 1 is a plan view of a steering mechanism embodying the invention; Fig. 2 is a detail side elevation, parts being shown in section; Fig. 3 is a side view of the attachment; Fig. 4 is a plan view of the attachment.

In the drawings the numeral 5 designates the front axle, 6 the wheel spindles, 7 the steering arms connected by a link 8 which is moved longitudinally by mechanism operating on the rod 9, all of which is of usual construction and is here specifically shown as that of the Ford automobile. The numeral 10 designates the attachments which effect the rearward displacement or offset of the wheel spindles with respect to the axle 5.

Each attachment 10 consists of a member having means for fixedly connecting it with one of the wheel spindles so as to move with the latter and means for pivotally connecting it with the forked ends 11 of the axle in the same manner as the wheel spindles themselves are usually connected with the axle by means of a pivot bolt 12 passing through the tubular body 13 of the attachment and through the apertured ends 11 of the axle and carrying the nut 14.

The member 10 is fixedly connected to the tubular portion 15 of the wheel spindle by rearwardly extending arms 16 having holes 17 therein through which the usual pivot bolt 18 for the wheel spindle passes and by which the spindle and the member 10 are clamped together and said member is also provided with an apertured boss 19 which registers with the apertured boss 20 of the wheel spindle in which the usual threaded end 21 of the steering arm 7 is mounted, said threaded end extending beyond the boss 20 and having mounted thereon a nut member 22 which clamps the bosses 19 and 20 and consequently the wheel spindle and member 10 together. The nut member 22 has a threaded sleeve portion 23 disposed within the opening in the boss 19 so as to provide a strong clamping connection and permit the attachment to be used with the steering arm customarily used with the wheel spindle.

The attachment may be readily installed by removing the wheel spindle, connecting the spindle and attachment together and then pivotally connecting the offset spindle thus formed to the axle by the bolt 12. In making the installation it is not necessary to remove the wheel or the steering arm from the usual spindle. The attachment displaces the wheel spindle rearwardly of the axle so that the spindle is eccentrically pivotally connected to the axle which makes the steering easier and causes the wheels to keep to the road better than when the spindle is alined with the axle.

We desire it to be understood that this invention is not limited to any specific form or arrangement of parts except in so far as such limitations are specified in the claims.

What we claim as our invention is:

1. In an automobile the combination, with the front axle, wheel spindle and the steering arm connected to the spindle, of a member having a tubular portion and arms extending rearwardly therefrom, a bolt passing through said arms and said spindle, a pivot bolt passing through said tubular portion and the end of the axle, an apertured boss on said member receiving the threaded end of the steering arm, and a clamping nut on the threaded end of said steering arm and engaging the boss.

2. In an automobile, the combination, with the front axle, wheel spindle and steering arm connected to the spindle, of a member having a tubular portion and rearwardly extending arms and an apertured boss, a bolt connecting said arms with the spindle, a pivot bolt passing through said tubular portion and the end of the axle, said apertured boss receiving the threaded end of the steering arm, and a clamping bolt having a threaded sleeve portion disposed within the boss and engaging the threaded end of said steering arm.

3. In an automobile, the combination, with the front axle, the wheel spindle having a tubular portion and a boss and the steering arm connected to the boss on said spindle, of a member having a tubular portion and arms offset therefrom, a bolt passing through said arms and the tubular portion of said spindle, a pivot bolt passing through said tubular portion of said member and the ends of the axle, and means detachably connecting the steering arm to said member and locking said spindle against movement.

In testimony whereof, we affix our signatures, in presence of two witnesses.

ROBERT S. PIERCE.
MAX R. KUEHN

Witnesses:
JOHN J. O'FARRELL,
LESLIE H. BONGUS.